United States Patent
Peters et al.

(10) Patent No.: US 9,294,191 B2
(45) Date of Patent: Mar. 22, 2016

(54) METHOD TO MITIGATE PROPAGATION LOSS IN WAVEGUIDE TRANSMISSION OF QUANTUM STATES

(71) Applicant: TT GOVERNMENT SOLUTIONS, INC., Basking Ridge, NJ (US)

(72) Inventors: Nicholas A. Peters, Laurel, MD (US); Anjali Agarwal, Old Bridge, NJ (US); Paul Toliver, Tinton Falls, NJ (US)

(73) Assignee: Vencore Labs, Inc., Basking Ridge, NJ (US)

( * ) Notice: Subject to any disclaimer, the term of this patent is extended or adjusted under 35 U.S.C. 154(b) by 148 days.

(21) Appl. No.: 14/046,148

(22) Filed: Oct. 4, 2013

(65) Prior Publication Data

US 2014/0099104 A1   Apr. 10, 2014

Related U.S. Application Data

(60) Provisional application No. 61/709,698, filed on Oct. 4, 2012.

(51) Int. Cl.
*H04B 10/12*   (2006.01)
*H04B 10/2507*   (2013.01)
*H04B 10/70*   (2013.01)
*H04L 9/08*   (2006.01)

(52) U.S. Cl.
CPC ............ *H04B 10/2507* (2013.01); *H04B 10/70* (2013.01); *H04L 9/0852* (2013.01)

(58) Field of Classification Search
CPC .. H04B 10/2507; H04B 10/70; H04L 9/0852; H04J 14/08; H01S 3/10
USPC ............. 398/25, 141, 158, 160; 356/326, 364
See application file for complete search history.

(56) References Cited

U.S. PATENT DOCUMENTS 6,897,434 B1 *   5/2005   Kumar et al. ............ 250/227.18

OTHER PUBLICATIONS

Notification of Transmittal of the International Search Report and the International Search Report dated Jan. 7, 2014, International Application No. PCT/US2013/63475 filed Oct. 4, 2013, 3-pages.
Liang et al., Ultra Stable All-Filter Telecom-Band Entangled Photon-Pair Source for Turnkey Quantum Communication Applications, Optic Express, vol. 14, No. 15. Jul. 24, 2006, 6-pages.

* cited by examiner

*Primary Examiner* — M. R. Sedighian
(74) *Attorney, Agent, or Firm* — George S. Blasiak, Esq.; Heslin Rothenberg Farley & Mesiti P.C.

(57) ABSTRACT

A system comprises a source of entangled photon pairs. The source is to place a signal photon and an idler photon in individual unknown quantum states but in a known entangled quantum state. One or more transmission channels are connected to the source. Each of the one or more transmission channels transmits one of the signal photon or the idler photon. Each of the one or more transmission channels is to substantially balance an instantaneous transmission loss with an instantaneous transmission gain distributed over a transmission distance. Analysis interferometers are configured to receive a corresponding one of the signal photon or the idler photon. Each of the one or more analysis interferometers is to perform a basis measurement on one of the signal photon or the idler photon. Single-photon detectors detect one of the signal photon or the idler photon.

23 Claims, 5 Drawing Sheets

METHOD TO MITIGATE PROPAGATION LOSS IN WAVEGUIDE TRANSMISSION OF QUANTUM STATES

CROSS-REFERENCE TO RELATED APPLICATIONS

This application claims the benefit of U.S. provisional patent application No. 61/709,698 filed Oct. 4, 2012, the disclosure of which is incorporated herein by reference in its entirety.

FIELD OF THE INVENTION

The present invention relates to quantum communications. More particularly, the present invention relates to a system and method for facilitating quantum communications.

BACKGROUND OF THE INVENTION

Quantum communications typically involves transmission of photons in unknown quantum states. Information may be encoded and transmitted in an optical fiber as a transmission channel in either a single-photon state or a two-photon state. One problem typically encountered during transmission is that photons are lost in the optical fiber. Even if a nearly perfect transmitter is employed that emits a perfect single-photon state or a two-photon state each time, the number of photons that make it through the optical fiber transmission channel drops exponentially with distance travelled through the transmission channel. As a result, a major challenge in quantum communications (QC) is that transmission loss exponentially reduces the throughput.

In classical communications, this exponential reduction in throughput does not occur because a classical signal, which generally contains a large number of average photons per bit, may be optically amplified at intermediate points in the transmission line to a degree that information bits are detectable with low probability of error at the receiver. When a signal comprising photons in unknown quantum states is amplified, enough noise is added such that the quality of the unknown state is degraded typically to the point of making it unusable for quantum communications protocols. This amplification of unknown quantum states, often called quantum cloning, necessarily causes a reduction in state quality. In the best case, quantum bit fidelity is reduced from 1 to 5/6 as described in V. Scarani, S. Iblisdir, N. Gisin, and A. Acin, "Quantum Cloning," Rev. Mod. Phys. 77, 1225 (2005). As a result, many quantum communications applications, such as Quantum Key Distribution (QKD), have generally been considered to be either impossible or impractical when quantum states are transmitted through amplifiers.

A single-photon signal prepared and transmitted in an unknown state cannot be measured and then, based on the measurement outcome, be recreated in exactly the same state. This condition is true because of the no-cloning theorem. As used herein, the no-cloning theorem refers to a condition in which an unknown quantum state cannot be copied without introducing a certain amount of fundamental noise. If a third party attempts to "steal" a photon, copy it, send on the copy to another location, errors in transmission of the photons are necessarily introduced. As a result, the presence of such errors indicate that the transmitted photons are no longer suitable for information use in some quantum communication protocols, such as quantum key distribution (QKD), and can trigger the protocol to be aborted.

As a consequence of the no-cloning theorem, one may create and distribute random keys among users, with a protocol known as quantum key distribution (QKD). QKD typically requires transmission of single-photon level signals in a randomly selected state, so that an ensemble of such states appears random. One way this is achieved is by distributing entangled two-photon states, as each individual photon in an ideal entangled-photon pair has no definite state in the entangled degree of freedom. Unfortunately, direct transmission of entangled photons is greatly limited by the transmission loss described above. For standard single mode telecommunications fiber, the loss is approximately 0.2 dB/km, limiting the maximum usable fiber quantum communications distance (either defined as the span over which Quantum Key Distribution may be performed or a span over which entanglement may be distributed and still be used to violate a Bell inequality) to lengths of less than about 250 km (corresponding to approximately 50 dB loss). Throughput drops by many orders of magnitude from the system transmit rate. While the throughput drop due to attenuation appears to be a fundamental limitation, there is an additional limitation due to receiver noise, which also limits tolerable losses such that the received signal probability is greater than the detector noise probability, which ultimately limits practical applications to fiber spans less than 250 km (see for example, D. Stucki, N. Walenta, F. Vannel, R. T. Thew, N. Gisin, H. Zbinden, S. Gray, C. R. Towery and S. Ten, High Rate, "Long-Distance Quantum Key Distribution over 250 km of Ultra Low Loss Fibers," New J. Phys. vol 11: 075003 (2009) and Y. Liu, T-Y Chen, J. Wang, W-Q Cai, X. Wan, L-K Chen, J-H Wang, S-B Liu, H. Liang, L. Yang, C-Z Peng, K. Chen, Z-B Chen, and J-W Pan, "Decoy-State Quantum Key Distribution With Polarized Photons over 200 km," Optics Express vol. 19, pp. 8587-8594 (2010).

Attempts have been made to find scalable solutions to the fiber optic transmission loss problem by (1) employing trusted relays (see for example, M. Peev et al., "The SECOQC Quantum Key Distribution Network in Vienna," New J. Phys. vol 11:075001 (2009) and references therein) and (2) employing quantum repeaters (see for example, N. Sangouard et al., "Quantum repeaters based on atomic ensembles and linear optics," Rev. Mod. Phys. 83, 33-80 (2011) and references therein).

Trusted relays break the optical link into several segments, where optical transmission is terminated at each trusted relay and measured. The classical results of measurements are then used to extend the reach over another optical link. While developed for Quantum Key Distribution applications, trusted relays do not work for general communication of quantum states (such as for example, the transmission of entangled states) because classical measurement at each relay destroys the quantum state and, for example, for a qubit, yields only a single classical bit.

Quantum repeaters are envisioned to distribute entanglement over short links, and then store an entangled photon in a quantum memory until an entangled photon from another link arrives at the same quantum memory. At this point, entanglement swapping is performed to build up entanglement over the two links. When a greater number of links are used, the same entanglement swapping protocol is repeated in multiple stages, allowing entanglement may be shared over a larger distance. In addition to requiring quantum memory for the quantum repeater, each entanglement swapping node requires Bell State analysis, which is typically comprised of single-photon detectors and a two-qubit photonic quantum gate.

Unfortunately, such quantum repeaters are not yet practical, although they are presently a focus of multiple research efforts. However, even if they become successful, quantum repeaters would still be subject to latency problems from the classical communication required as part of the protocol.

In addition, as discussed above, current techniques for transmitting single-photon level signals though optical fibers in unknown quantum states are subject to exponential loss in throughput. To achieve a certain throughput after increasing the fiber transmission distance and necessarily increasing the loss, receivers need to wait increasingly longer periods of time to receive the same total number of photons as would be observed after transmission though shorter, lower loss fibers. That waiting period, because of the non-deterministic transmission of the fiber, is a further cause of latency. For example, if photons are transmitted at a gigabit per second, over a typical 200 km long fiber with total loss of 40 dB, even if all other components were ideal, only about one out of every 10,000 sent would be received, making direct transmission highly inefficient.

Accordingly, what would be desirable, but has not yet been provided, is a method and system for facilitating quantum communications that mitigates propagation loss in waveguide transmission of quantum states without violating the no-cloning theorem.

SUMMARY OF THE INVENTION

The above-described problems are addressed and a technical solution is achieved in the art by providing a system for facilitating quantum communications. The system comprises a source of photons. The source is configured to place a signal photon and an idler photon in individual unknown quantum states but in a combined entangled quantum state. One or more (e.g. a pair of) transmission channels are connected from the source to two distinct receiver locations where quantum state analysis and the protocol processing occur. Each of the one or more transmission channels is configured to transport one of the signal photon or the idler photon. Each of the one or more transmission channels is configured to substantially balance an instantaneous transmission loss with an instantaneous transmission gain distributed over a transmission distance. A pair of interferometers for quantum state analysis is connected with a corresponding one of the pair of transmission channels. In the case of a single transmission channel, one of the signal photon or the idler photon is kept at the source and the other is transported over the transmission channel. Each of the interferometers is configured to perform a randomly-selected basis measurement on the signal photon or the idler photon. At the output of the interferometers, single-photon detectors detect one of the signal photon or the idler photon.

In one example, the source for generating the signal photon and the idler photon comprises a time-bin entangled source of photons. The time-bin entangled source may comprise a pump laser for generating the signal photon and the idler photon at a signal wavelength and an idler wavelength, respectively. The pump laser may be a mode-locked laser configured to produce short pulses of light at a given repetition rate. The time-bin entangled source may further comprise a time-imbalanced interferometer coupled to the pump laser to split pulses of light generated by the pump laser into two time bins. A degree of imbalance of time traveled by photons in the time-imbalanced source interferometer may match a degree of imbalance of time traveled by photons in each of the pair of analysis interferometers configured to receive the corresponding one of the signal photon or the idler photon. The time-bin entangled source may further comprise a dispersion shifter fiber coupled to the time-imbalanced source interferometer to generate the signal and idler photons and a wavelength division demultiplexer coupled to the dispersion shifted fiber. The wavelength division demultiplexer may be configured to separate and transmit the signal photon and the idler photon in a corresponding one of the transmission channels.

In one example, the time-bin entangled source may be substantially centrally located with respect to each of the receiver locations.

In one example, each of the one or more transmission channels may comprise a distributed optical phase-sensitive amplifier (OPSA). The distributed optical phase-sensitive amplifier may comprise a dispersion-shifted fiber. The dispersion-shifted fiber may be configured to have a zero-dispersion wavelength proximal to a wavelength of operation of a pump laser associated with the source for creating the signal photon and the idler photon. Various configurations for non-degenerate fiber-based OPSAs exist that generally require the presence of at least 3 frequencies at the input (see e.g., C. J. McKinstrie and S. Radic, "Phase-sensitive amplification in a fiber," Optics Express, Vol. 12, No. 20, pp. 4973-4979, 2004.).

A transmission channel may further comprise a pump refresh stage coupled to the dispersion shifted fiber for amplifying a pump signal transported along with the signal photon and the idler photon.

In one example, the distributed OPSA channel comprises pulsed pump lasers with frequency non-degenerate signal and idler photons. The source may be configured to generate two pairs of signal and idler photons using two phase-locked pumps (see for example, C. J. McKinstrie, S. J. van Enk, M. G. Raymer and S. Radic, "Multicolor multipartite entanglement produced by vector four-wave mixing in a fiber," Optics Express, Vol. 16, No. 4, pp. 2720-2739, 2008.). Each signal and idler pair along with the corresponding pump is then wavelength demultiplexed onto separate fibers for transmission. Note that the pumps used in the source may be re-used in the distributed OPSA channel.

Another example comprises two phase-locked pulsed pumps with frequency degenerate signal and idler photons. The distributed OPSA channel comprises a pair of phase-locked pump laser pulses with the frequency degenerate signal and idler photons frequency located centrally with respect to the two pumps.

In one example, each of one or more transmission channels may further comprise a dispersion compensation module in optical communication with the dispersion shifted fiber to restore the originally transmitted pulse shape of a signal corresponding to the idler photon or the signal photon.

In one example, quantum state analysis at the receiver location may comprise a pair of interferometers and a passive polarization-independent beam splitter to randomly choose between non-orthogonal basis state measurements at each receiver location independently.

The above-described problems are addressed and a technical solution is achieved in the art by providing a method for facilitating quantum communications. A source of photons generates a signal photon and an idler photon. Each of the signal photon and the idler photon is in an unknown quantum state and in a combined quantum state. The signal photon and the idler photon are separated through passive components such as a wavelength division demultiplexer. The time-bin entangled source transmits each of the signal photon and the idler photon separately in one or more transmission channels. Each of the one or more transmission channels may be operable to substantially balance an instantaneous transmission loss with an instantaneous transmission gain distributed over a transmission distance. Each of a pair of analysis interferometers performs a randomly-selected basis measurement on one of the signal photon and the idler photon. A set of single-photon detectors detect the signal photon or the idler photon after the analysis interferometers.

In an example, the source of photons may be time-bin entangling the signal photon and the idler photon, where the signal photon and idler photon are in a known two-photon entangled state. The quantum state analysis may each comprise one or more analysis interferometers for each photon of the entangled pair and a passive polarization-independent beam splitter to randomly choose between non-orthogonal basis projections of each interferometer at each receiver location independently.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

Figure 1:
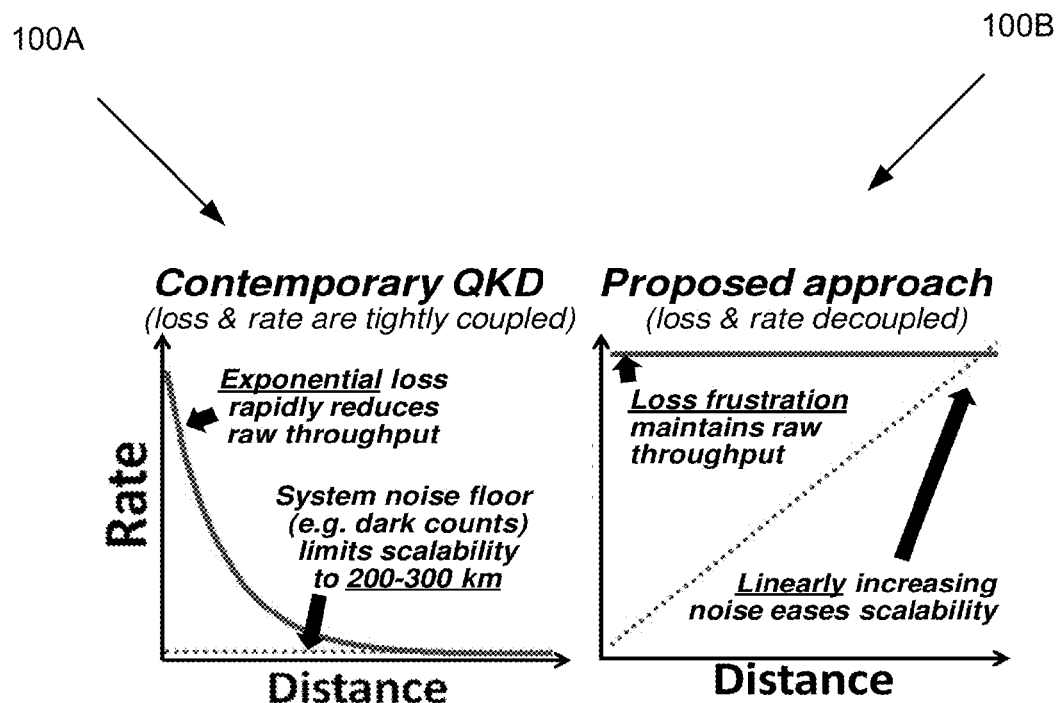
FIG. 1 shows a comparison of a graph of relative performance of related art quantum communications transmission of photons in an optical medium compared to a graph of same for examples of the present disclosure.

FIG. 1 shows a comparison of a graph 100A of relative performance of related art quantum communications transmission of photons in an optical medium compared to a graph 100B of same for examples of the present disclosure. Graph 100A shows that the transmission rate with distance into a medium for contemporary quantum state transmission falls off exponentially, rapidly reducing raw throughput. The rate falls off to a relatively constant low value of a noise floor. Loss and transmission rate are tightly coupled. In graph 100B, in contrast, transmission rate remains relatively high with distance into a medium, while noise increases only linearly with distance. Loss in the medium and transmission rate is decoupled.

Embodiments of the present disclosure decouple an expected exponential drop of quantum communications throughput with distance using a distributed optical phase sensitive amplifier (OPSA) for loss frustration tailored to a known entangled state. Because the entangled state is known, unacceptably high and unavoidable errors from unknown state amplification in quantum cloning is avoided. Embodiments of the present disclosure are configured to transmit known time-bin entangled states, which may then be used to perform quantum computing or quantum communications applications. One such application, QKD, may be carried out according to established methods as described in I. Marcikic, H. de Riedmatten, W. Tittel, H. Zbinden, M. Legre, N. Gisin, "Distribution of time-bin entangled qubits over 50 km of optical fiber," Phys Rev Lett. 93, 180502 (2004) (hereinafter "Marcikic"). An OPSA is operated with a low instantaneous gain (i.e., the creation operator amplitude is low, to minimize simultaneous multi-entangled pair errors) to balance instantaneous fiber loss (canceling the annihilation operator amplitude). The distributed OPSA can amplify a known state adding only the absolutely lowest possible noise, frustrating loss at the cost of only a linearly increasing noise with increasing transmission distance. Embodiments of the present disclosure do not require quantum memories and avoid the issues involving the use of secure relay enclaves.

Figure 2:
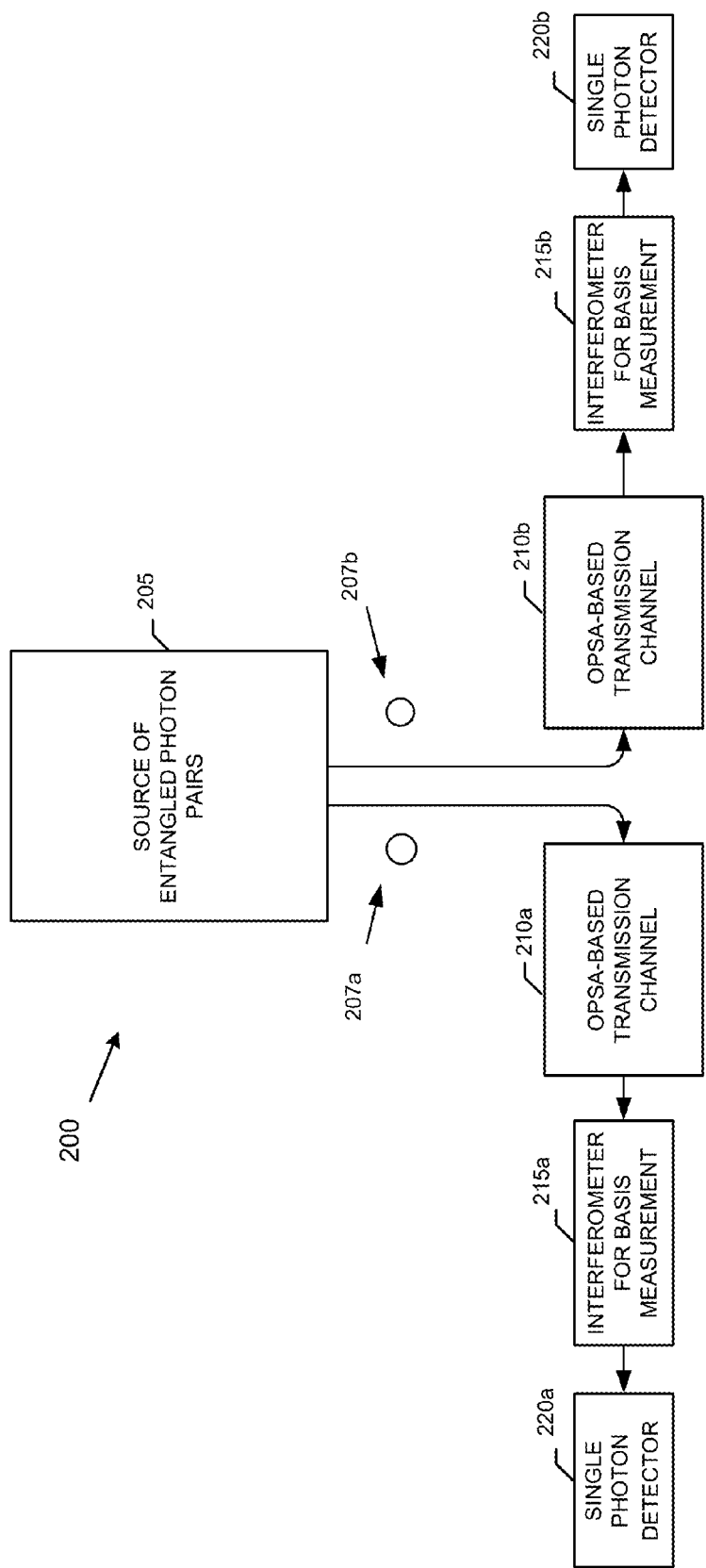
FIG. 2 is a block diagram of one embodiment of a system for facilitating quantum communications in which embodiments of the present disclosure may operate.

FIG. 2 is a block diagram illustrating one embodiment of a system 200 for facilitating quantum communications in which embodiments of the present disclosure may operate. The system 200 comprises a source of photons 205. The source 205 is configured to generate a signal photon 207a and an idler photon 207b (e.g., pairs of entangled photons). The source 205 is configured to place the signal photon 207a and the idler photon 207b in individual unknown quantum states. The source 205 is also configured to place the signal photon 207a and the idler photon 207b in a known entangled quantum state. In one example, the source 205 comprises a time-bin entangled source of photons.

Distributed entangled pairs may then be used for a wide variety of quantum computing or communications protocols including, but not limited to QKD. Additional quantum protocols include, for example, remote state preparation (the transmission of a known qubit between users who share an entangled qubit pair) and teleportation (the transmission of an unknown qubit state between users who share an entangled qubit pair). By using entanglement, the vast literature devoted to establishing the security of entanglement-based QKD approaches may be leveraged (see e.g., V. Scarani, H. Bechmann-Pasquinucci, N. J. Cerf, M. Dusek, N. Lutkenhaus, and M. Peev, "The Security of Practical Quantum Key Distribution," Rev. Mod. Phys. 81, 1301 (2009)).

The system 200 further comprises a pair of transmission channels 210a, 210b in optical communication with the source 205. The transmission channels 210a, 210b transmit the signal photon 207a and the idler photon 207b, respectively. The transmission channels 210a, 210b are each configured to substantially balance an instantaneous transmission loss with an instantaneous transmission gain distributed over a transmission distance. In one example, the transmission channels 210a, 210b comprise a distributed optical phase-sensitive amplifier (OPSA). In one example, the distributed optical phase-sensitive amplifier may comprise a dispersion-shifted fiber.

By employing distributed phase-sensitive amplification in the transmission link formed from dispersion-shifted fiber (DSF), gain offsets loss at every point in the dispersion-shifted fiber. This minimizes multi-photon creation and prevents the decay of a photon into a vacuum state. The distributed OPSA transmission channel overcomes the exponential reduction in rate with increasing transmission loss, normally encountered in quantum signal transmission and provides a method to extend the rates and distances of quantum communications in fiber-optic networks.

The transmission channel may comprise pump refresh stages coupled at intermediate locations to the dispersion shifted fiber for amplifying a pump signal associated with the source 205 for generating the signal photon 207a and the idler photon 207b.

The system 200 further comprises a pair of interferometers 215a, 215b connected to the corresponding one of the pair of transmission channels, 210a, 210b. Each of the pair of interferometers 215a, 215b is configured to individually perform a randomly-selected basis measurement on the signal photon 207a and the idler photon 207b, respectively. In one example, the interferometers 215a, 215b may each comprise a passive polarization-independent beam splitter to randomly choose between analyzing the quantum states of the signal photon 207a or the idler photon 207b in one of two non-orthogonal bases. The system 200 further comprises one or more pair(s) of single-photon detectors 220a, 220b. The single-photon detectors 220a, 220b are each configured to detect the signal photon 207a and the idler photon 207b, respectively. In one example, the source 205 is substantially centrally located with respect to each of the pair of single photon detectors 220a, 220b.

In another example, the system 200 may comprise one transmission channel that transports one of the signal photon or the idler photon and keeps the other photon along with one or more analysis interferometers and one or more single photon detectors configured to detect a corresponding one of the signal photon or the idler photon.

Figure 3:
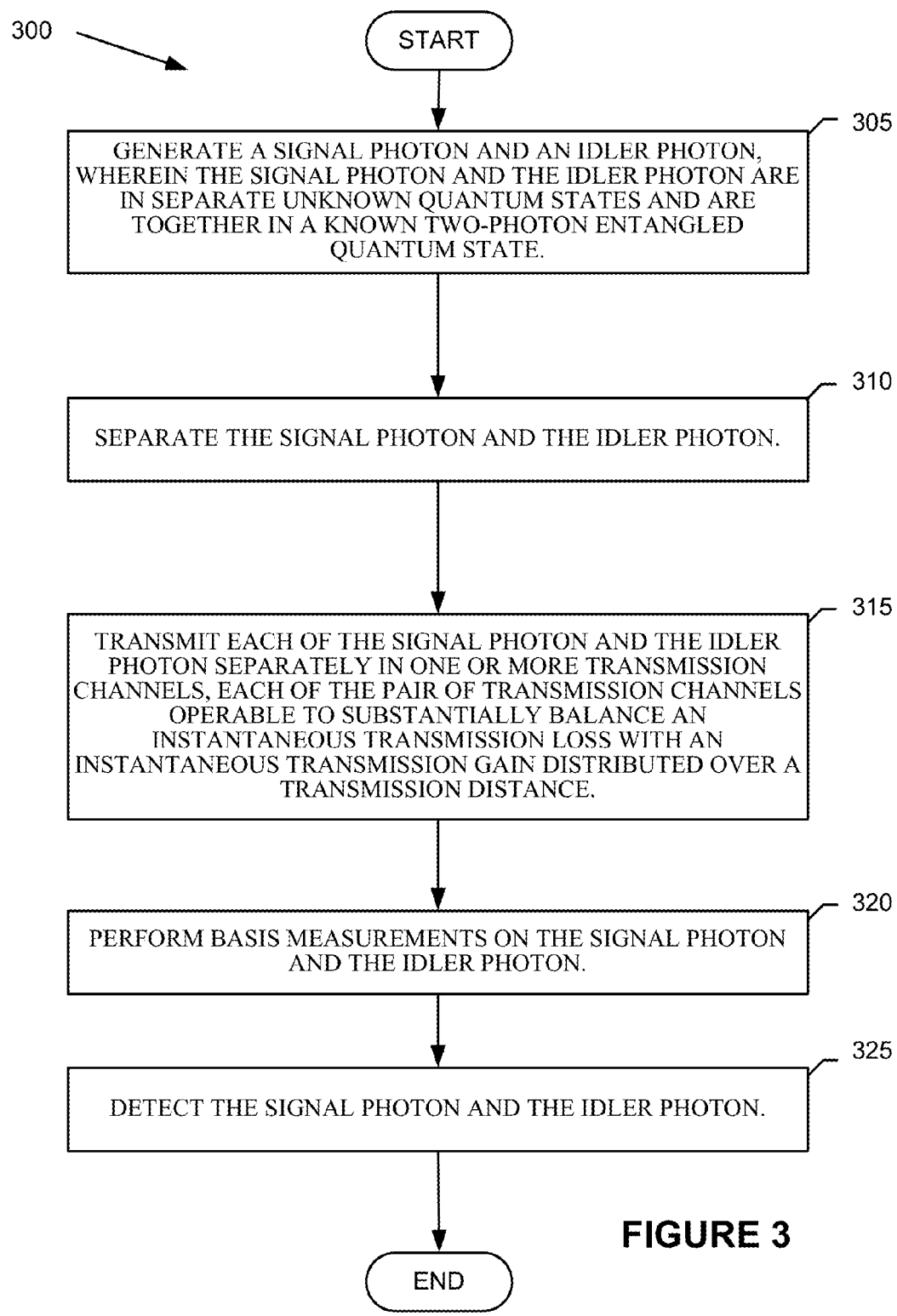
FIG. 3 is a process flow diagram illustrating of one embodiment of a method for facilitating quantum communications.

FIG. 3 is a process flow diagram illustrating one embodiment of a method 300 for facilitating quantum communications. The method 300 may be performed by the system 200 of FIG. 2. In one embodiment, method 300 begins when, at block 305, a time-bin entangled source of photons 205 generates a signal photon 207a and an idler photon 207b. The signal photon 207a and the idler photon 207b are individually in unknown quantum states and together in a known two-photon entangled quantum state. In one example, the source produces the signal photon 207a and the idler photon 207a in a time-bin entangled state.

At block 310, the source 205 separates the signal photon 207a and the idler photon 207b. At block 315, the source 205 transmits the signal photon 207a and the idler photon 207b separately in corresponding transmission channels 210a, 210b, respectively. The transmission channels 210a, 210b are operable to substantially balance an instantaneous transmission loss with an instantaneous transmission gain distributed over a transmission distance. In one example, each of the one or more transmission channels 210a, 210b comprises a distributed optical phase-sensitive amplifier. In one example, the distributed optical phase-sensitive amplifier may comprise a dispersion-shifted fiber. The distributed optical phase-sensitive amplifier may comprise one or more pump refresh stages coupled to the dispersion shifted fiber at intermediate locations for amplifying a pump signal associated with the source 205 that generated the signal photon 207a and the idler photon 207b.

At block 320, interferometers 215a, 215b perform basis measurement on the signal photon 207a and the idler photon 207b, respectively. In one example, the interferometers 215a, 215b may each comprise a passive polarization-independent beam splitter to randomly choose between analyzing the quantum states of the signal photon 207a or the idler photon 207b in one of two non orthogonal bases. At block 325, single-photon detectors 220a, 220b detect a corresponding one of the signal photon 207a and the idler photon 207b.

Figure 4:
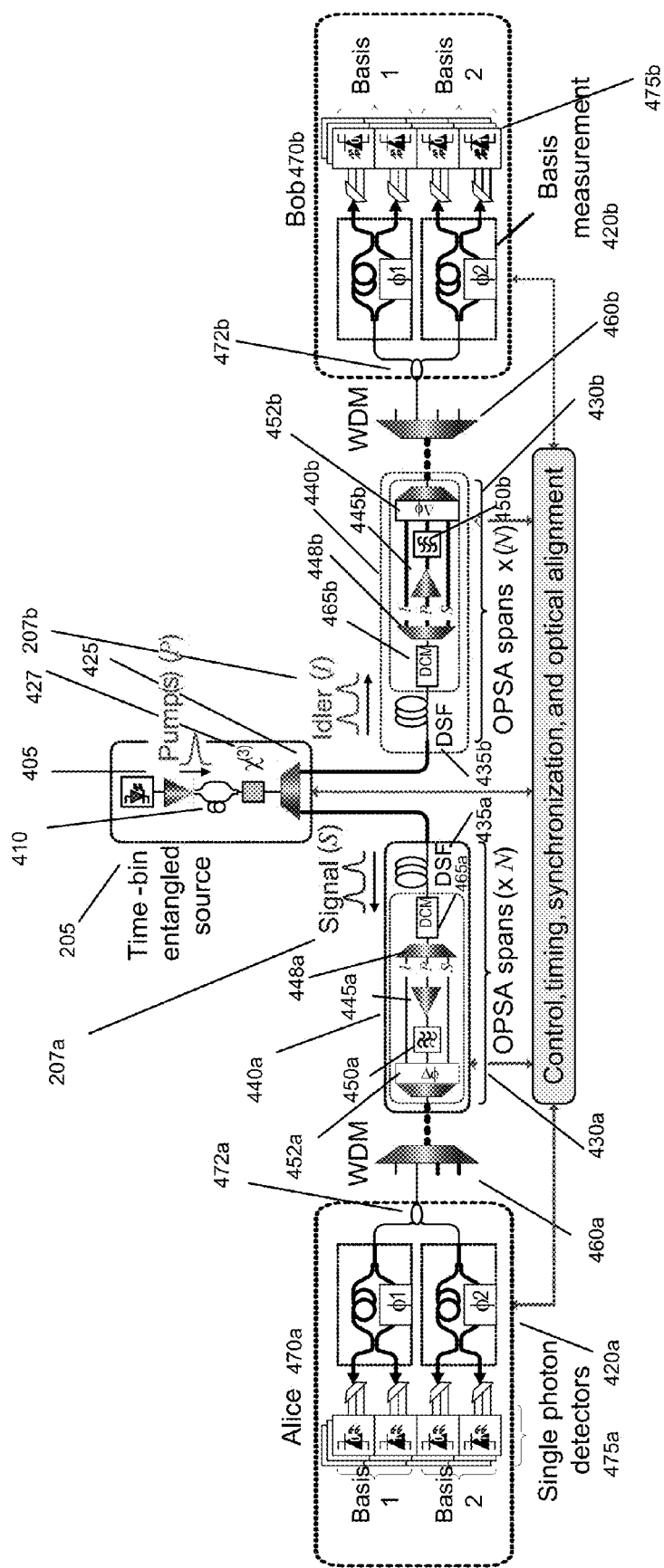
FIG. 4 is a block diagram illustrating one example of an implementation of the system of FIG. 2.

FIG. 4 is a block diagram illustrating one example of an implementation of the system 200 of FIG. 2. The source 205 for generating a signal photon 207a and an idler photon 207b (e.g., pairs of entangled photons) may comprise a time-bin entangled source of photons 205. The time-bin entangled source of photons 205 may comprise a pump laser 405 for generating the signal photon 207a and the idler photon 207b at a signal wavelength and an idler wavelength, respectively. In one example, the pump laser 405 may be a mode locked laser 405 configured to operate in a pulsed mode. In another example, the pump laser 405 may be configured to operate in a continuous wave (CW) mode.

In one example, the pump laser 405 employed in the time-bin entangled source 205 permits the generation of pairs of entangled photons at signal and idler wavelengths, each having spectral widths, $\Delta\lambda$, of approximately 3.2 nm (~400 GHz). The source 205 can have wide bandwidth signal generation and thus enable transmission of many-wavelength multiplexed entangled photon pairs. A pulsed pump source also serves as a primary reference for the entire system 200, providing both an optical phase and repetition frequency reference as needed by other subsystems.

The time-bin entangled source of photons 205 may further comprise a time-imbalanced source interferometer 410 coupled to the pump laser 405 to split pulses of light generated by the pump laser 405 into two time bins. The time-imbalanced interferometer 410 may be identically configured to and operate in the same manner as the analysis interferometers 420a, 420b. The interferometers, 215a, 215b, may each comprise passive polarization-independent beam splitters 472a, 472b, configured to choose randomly between analysis of the quantum states of the signal photon 207a or the idler photon 207b in the non orthogonal basis 1 or basis 2. In operation, a degree of imbalance of time traveled by photons in the time-imbalanced interferometer 410 matches a degree of imbalance of time traveled by photons in each of the pair of interferometers 420a, 420b. The entangled signal/idler spectrums are separated by the wavelength demultiplexer 425 for transmission to receiver locations, Alice 470a and Bob 470b.

The time-bin entangled source of photons 205 may further comprise a dispersion shifted fiber 427 coupled to the time-imbalanced interferometer 410 to generate the signal and idler photons and to the wavelength division demultiplexer. The demultiplexer 425 is configured to separate and to transmit the signal photon 207a and the idler photon 207b in a corresponding one of a pair of transmission channels 210a, 210b, respectively.

The transmission channels 210a, 210b are configured to substantially balance an instantaneous transmission loss with an instantaneous transmission gain distributed over a transmission distance. In one example, the transmission channels 210a, 210b may each comprise distributed optical phase-sensitive amplifiers (OPSA) 430a, 430b for loss-regulation. In one example, the distributed optical phase-sensitive amplifiers 430a, 430b may each comprise dispersion-shifted fibers 435a, 435b. Dispersion-shifted fiber (DSF) is used to optimize OPSA performance by aligning its zero-dispersion wavelength close to the pump wavelength of the pump laser 405 associated with the source 205, which, in an example, may be centered at the common telecommunications wavelength of ~1550 nm. Furthermore, dispersion-shifted fiber allows for efficient four wave mixing (FWM) at 1550 nm.

Operating near 1550 nm in the C-band with DSF provides a lowest possible loss (which influences noise from vacuum fluctuations) and with a greatest possible reach. However, examples of the present disclosure are in principle applicable to standard single mode fiber (SSMF) transmission with a shift in wavelength to the O-band (around 1310 nm) where SSMF has its zero dispersion wavelength. At 1310 nm, SSMF behaves much like DSF does at 1550 nm; namely, it exhibits enhanced nonlinear behavior and hence may be employed on current fiber infrastructure.

The transmission channel further comprise of one or more corresponding pump refresh stages 440a, 440b coupled to the dispersion shifted fibers 435a, 435b at intermediate locations for amplifying a pump signal associated with the source 205. In one example, each of the pump refresh stages 440a, 440b may comprise optical amplifiers 445a, 445b connected to the dispersion shifted fibers 435a, 435b for compensating loss of the pump signals co-propagating with the signal and idler photons. Each of the pump refresh stages 440a, 440b may further comprise optical demultiplexers 448a, 448b, optical filtering elements 450a, 450b, and phase-realignment elements 452a and 452b coupled to the dispersion shifted fibers 435a, 435b.

Since the pump power in a transmission fiber steadily decreases during transmission due to fiber losses, which decreases its ability to mitigate loss on the single-photon wavelength channels, the pump power may be periodically refreshed with amplification stages (e.g., the pump refresh stages 440a, 440b). Fortunately, since the pump signal 405 operates at classical power levels, standard phase-insensitive amplification techniques (e.g., EDFAs) may be employed within these stages. By using low-loss, high-isolation filtering techniques (see N. A. Peters et al., New J. Phys. 11, 45012 (2009), T. C. Chapuran et al., New J. Phys. 11, 105001 (2009)), the high-power pump wavelength can be separated, amplified, and recombined with the single-photon channels 450a, 450b for the loss-regulated transmission over a next span of DSF, each of which may be ~10 to ~25 km long (~2 to ~5 dB loss at 1550 nm).

In a recombining step, the signal/pump/idler signals need to be actively phase re-aligned to ensure optimal OPSA operation. For typical fiber parameters, pump, signal and idler pulses will not disperse significantly compared to the pump pulse width during each stage. However, the signal and idler pulses will walk-off from the pump pulse. For a continuous wave (CW) pump, this walk-off is not an issue.

Each of the transmission channels 210a, 210b may further comprise dispersion compensation modules 465a, 465b coupled between the dispersion shifted fibers 435a, 435b and the optical demultiplexers 448a, 448b, respectively, to preserve a pulse shape of a signal corresponding to the signal photon 207a or the idler photon 207b.

Various configurations for non-degenerate fiber-based OPSAs exist that generally require the presence of at least 3 frequencies at the input (see C. J. McKinstrie and S. Radic, "Phase-sensitive amplification in a fiber," Optics Express, Vol. 12, No. 20, pp. 4973-4979, 2004). This can be achieved in a variety of ways. One embodiment comprises pulsed pump lasers 405 configuration with non-degenerate signal and idler wavelength division multiplexed (WDM) channels, with all WDM channels sharing the same pump. In one embodiment, the source may be configured to generate two pairs of signal and idler photons using a pair of phase-locked pump lasers (see for example, C. J. McKinstrie, S. J. van Enk, M. G. Raymer and S. Radic, "Multicolor multipartite entanglement produced by vector four-wave mixing in a fiber," Optics Express, Vol. 16, No. 4, pp. 2720-2739, 2008.). Each signal and idler pair along with the corresponding pumps is then wavelength demultiplexed onto separate fibers for transmission. Note that the pumps used in the source may be re-used in the distributed OPSA channel. A second embodiment comprises two phase-locked pulsed pumps with frequency degenerate signal and idler photons. This configuration comprises a pair of phase-locked pump lasers with frequency degenerate signal and idler photons frequency located centrally with respect to the two pumps.

After transmission, multiple channels may be separated using wave-division multiplexing (WDM). For example, in the one example, the signal/idler spectrums may be carved into a pair-wise array of 8 independent entanglement channels using 50 GHz-spaced WDMs 460a, 460b.

A pair of basis measurement interferometers 420a, 420b may be connected to a corresponding one of the pair of transmission channels 210a, 210b. Each of the pair of interferometers 420a, 420b is configured to perform basis measurement on the signal photon 207a or the idler photon 207b. Each of the basis measurement interferometers 420a, 420b may be set to an appropriate phase offset (e.g., $\phi_1=0$, $\phi_2=\pi/2$ relative to the source time-imbalanced interferometer 410) using stabilization techniques as described in T. K. Woodward, et al., "Systems perspectives on optically-assisted RF signal processing using silicon photonics," Microwave Photonics 2011, 377-380, 2011, incorporated by reference herein in its entirety.

For quantum key distribution applications, each user 470a, 470b (Alice and Bob) randomly selects non-orthogonal bases for analysis. Other applications may use different analysis configurations. In this example, the two non-orthogonal bases are set by the phase setting $\phi1$, $\phi2$ of their analysis interferometer, which gives rise to correlations for certain basis choices. In practice the two users 470a, 470b do not need to actively select a basis if each uses a passive polarization-independent beam splitter 472a, 472b to randomly choose between two analysis interferometers set to measure the two non-orthogonal basis needed for quantum key distribution. Such an approach eliminates the need for a multi-GHz random number generator at each user 470a, 470b to drive the basis selection. After transmission over the loss-regulating OPSA 430a, 430b, Alice 470a and Bob 470b may receive signal photons 207a and idler photons 207b, respectively, that are entangled with one another with sufficient fidelity for quantum computing or communication protocols, such as QKD.

To this effect, the interferometers 215a, 215b may be each coupled to corresponding single-photon detectors 475a, 475b. The single-photon detectors 475a, 475b are each configured to detect the signal photon 207a and the idler photon 207b, respectively. Coincidence measurements between the entangled signal photon 207a and idler photon 207b may be used in combination with a particular quantum communications system protocol, such as QKD.

In one example, the source 205 is substantially centrally located with respect to each of the pair of single photon detectors 475a, 475b.

The centralized time-bin entangled source 410 may employ some standard elements of previous time bin-entanglement creation methods (see, e.g., J. Brendel, N. Gisin, W. Tittel, H. Zbinden, "Pulsed energy-time entangled twin-photon source for quantum communication," Phys. Rev. Lett. 82, 2594 (1999), I. Marcikic, H. de Riedmatten, W. Tittel, H. Zbinden, M. Legre, N. Gisin, "Distribution of time-bin entangled qubits over 50 km of optical fiber," Phys Rev Lett. 93, 180502 (2004), and H. Takesue and K. Inoue, "Generation of 1.5-μm band time-bin entanglement using spontaneous fiber four-wave mixing and planar light-wave circuit interferometers," Phys. Rev. A 72, 041804(R) (2005)). A pump pulse from a mode locked laser may be split into two time bins ("0" & "1", corresponding to the short and long path of the pump pulse, respectively) by the time-imbalanced interferometer 410. The two pump pulses may pass through a nonlinear fiber, creating a photon pair 207a, 207b with equal likelihood in either time bin with a low pair creation probability, typically less than 1% of the time, so that a pair is unlikely to be created in both time bins simultaneously, which causes multi-photon errors). This gives the superposition of a pair being created either in the first time bin or the second time bin, where there is a relative phase ϕ due to the differences between the long and short paths of the time-imbalanced interferometer 410. The phase ϕ is set to 0 with a phase shifter in the time-imbalanced interferometer 410 of the pump laser 405 so that the time bin qubits share a common phase with the pump laser 405 during transmission. An important aspect of time bin entanglement is the analysis, which requires each of the two end users 470a, 470b to have an imbalanced interferometer matching that of the pump interferometer 410. The analysis interferometers 420a, 420b erase the distinguishing information of the pair creation time by directly interfering the two processes: (1) photons are born in the first time bin (corresponding to the short interferometer arm) but transit the long analysis interferometer arms and (2) photons are born in the second time bin but transit the short analysis arms.

The source 405 has a wide amplification bandwidth and hence is capable of multi-wavelength operation, which enables creation of many pairs of time-bin entangled photon channels, similar to a pervious demonstration of two polarization entanglement channels (S. X. Wang, G. S. Kanter, and P. Kumar, "Multi-Channel Fiber-Based Source of Polarization Entangled Photons with Integrated Alignment Signal," Optical Fiber Communication Conference, San Diego, Calif. United States, March 22-26, Post deadline paper A3 (2009) http://dx.doi.org/10.1364/OFC.2009.PDPA3). Compared to polarization entanglement, time-bin entanglement not only has lower sensitivity to polarization mode dispersion (PMD) and greater robustness to polarization dependent loss (PDL), but also allows for compatibility with the distributed loss compensation scheme. Many experiments show that both time-bin and polarization are suitable for relatively short fiber links on the order of 100 km. However, over the much longer distances, polarization entanglement carries much greater risk as polarization mode dispersion (PMD) can have a more significant effect and lead to entanglement sudden death (see e.g., C. Antonelli, M. Shtaif, M. Brodsky, "Sudden Death of Entanglement induced by Polarization Mode Dispersion," Phys. Rev. Lett. 106, 080404 (2011); arXiv:1101.5417). The reason for this is that polarization effects during fiber transmission directly affect the polarization qubit, whereas they only affect time bin qubits to second order, e.g., if the polarization is off it slightly reduces the depth of modulation of analysis due to the technical reason that most phase modulators exhibit best extinction only for one polarization. Time-bin entanglement thus has a much lower sensitivity to PMD.

For classical signals, an OPSA preserves the signal-to-noise ratio (SNR) of input signals (see, e.g., C. M. Caves, "Quantum limits on noise in linear amplifiers," Phys. Rev. D. 26, 1817 (1982) (hereinafter "Caves) and H. P. Yuen, "Reduction of quantum fluctuation and suppression of the Gordon-Haus effect with phase-sensitive linear amplifiers," Optics Lett., Vol. 17, pp. 73-75 (1992) (hereinafter "Yuen")). Here, distributed OPSAs are employed for quantum signals. The distributed OPSA is used to compensate exactly for the loss in the transmission fiber in order to distribute entangled single photons over long distances.

The Distributed OPSAs 430a, 430b are employed with time-bin entangled photons, thereby realizing a loss frustration mechanism by balancing the instantaneous fiber loss with an instantaneous gain. Since the instantaneous loss is low, the instantaneous gain is kept low to minimize the likelihood of a multi-photon amplification event, which results in entangled state errors. Since multiple entangled pairs are not created from a single unknown entangled pair, the no-cloning theorem (see e.g., V. Scarani, S. Iblisdir, N. Gisin, and A. Acin, "Quantum Cloning," Rev. Mod. Phys. 77, 1225 (2005) and references therein) is not violated. A photon pair 207a, 207b is created at an entangled source weakly (such that the likelihood that two photon pairs are simultaneously created is negligible) but with equal probability in one of two time-bins. This gives a superposition state of a photon pair and vacuum between the two time bins. The phase of the photon pair and hence of the time-bins is fixed relative to the pump laser 405 because of the spontaneous four wave mixing (FWM) creation process. Fixing the phase of the time bin thus fixes the quantum state that is transmitted, which permits it to be acted on by the distributed OPSA 430a, 430b. An indistinguishable superposition is formed by erasing which path led to photon pair creation, only at each user's measurement interferometers 420a, 420b. Excess noise may be introduced either by spontaneous emission in the OPSAs 430a, 430b or through vacuum fluctuations due to fiber loss or from Raman scattering in the transmission fiber.

The impact of vacuum fluctuations due to fiber loss for the distributed OPSAs 430a, 430b shows that the average added noise grows linearly with transmission distance. This is in contrast to the exponential decrease of signal with distance in direct transmission approaches. Thus, examples of the present disclosure approach decouple transmission loss from throughput rate, which drops exponentially in other approaches. Post-selection (time-correlated filtering) through coincidence counting helps mitigate the impact of this quantum noise. A distributed OPSA as a loss frustration mechanism is employed to offset the loss at every point in the transmission fiber while also minimizing multi-photon amplification events which can cause errors. This may enable transmission of time-bin entanglement over long distances at high throughput rates.

Parametric amplification in fiber is made possible by a variety of four-wave mixing (FWM) processes (see e.g., C. McKinstrie et al., "Parametric amplifiers driven by two pump waves," J. Sel. Top. Quantum Electron. 8, 538-547 and 956 (2002)) and may be implemented in a phase-sensitive manner or a phase-insensitive manner. One consideration is the accumulation of noise in the transmission system. Phase-sensitive amplification provides the benefit of introducing lower noise compared to phase-insensitive amplification.

As shown herein below, a mathematical description of distributed loss compensation of entangled single-photons using an OPSA follows and a preliminary quantum noise analysis is presented wherein the input is a frequency correlated state described by $|\psi\rangle=(\alpha|00\rangle+\beta|11\rangle)$; where $|\alpha|^2+|\beta|^2=1$. The first term refers to zero photons in the signal and idler channels, which has a probability of $|\alpha|^2$ while the second term refers to one photon each in the signal 207a and idler 207b, which occurs with a probability of $|\beta|^2$. By considering the ratio of output signal to the generated noise, we can predict a visibility upper bound, which is a common metric by which the quality of entanglement may be quantified. The mean input photon number is given by $|\beta|^2$. This calculation includes noise from vacuum fluctuations due to fiber loss. The parametric amplification equations are solved as in M. Vasilyev, "Distributed phase-sensitive amplification," Opt. Express 13, 7563-7571 (2005), but also include the effect of fiber loss for a single pump and non-degenerate signal and idler configuration (the solutions for two-pump configuration are similar). As described above, the signal 207a and idler 207b are sent on two separate fiber pairs. This leads to four parametric equations describing signal and idler propagation with distributed OPSAs 430a, 430b on two fibers. For the theoretical analysis here, it is assumed that the distributed OPSAs 430a, 430b on each fiber is identical and hence the parametric equations for each fiber are identical. The OPSA noise performance may be modeled with only two parametric equations for the signal 207a and idler 207b of the correlated pair. Assuming continuous wave (CW) operation, undepleted pump, and neglecting pump attenuation, the signal ($A_s(z)$) and idler ($A_i(z)$) output field operators after a distance z are:

$$A_s(z) = A_s'(z)e^{-\alpha_1 z/2} + F_s(z) \quad (1)$$
$$A_i(z) = A_i'(z)e^{-\alpha_1 z/2} + F_i(z)$$

$$\mu(z) = e^{\frac{i}{2}[\Delta\beta+2\gamma P]z}\left\{\cosh(gz) - \frac{i}{2g}(\Delta\beta - 2\gamma P)\sinh(gz)\right\}; \quad (2)$$

$$\nu(z) = ie^{\frac{i}{2}[\Delta\beta+2\gamma P]z}\frac{\gamma P}{g}e^{2i\theta_p}\sinh(gz)$$

where $A_s'(z)=\mu A_s(0)+\nu A_i^+(0)$; $A_i'(z)=\mu A_i(0)+\nu A_s^+(0)$, $|\mu|^2-|\nu|^2=1$, $k=\Delta\beta-2\gamma P$ is the phase-mismatch, $$g = \sqrt{(\gamma P)^2 - \frac{1}{4}(\Delta\beta - 2\gamma P)^2}$$

is the gain factor, P is the peak pump power, $\gamma$ is the nonlinear coefficient, $\Delta\beta$ is the wave-vector mismatch, $\theta_p$ is the input phase of the pump, and $\alpha_1$ is the linear fiber loss. $A_s(0)$ and $A_i(0)$ are the signal and idler fields at the input. Further $F_s(z)$ and $F_i(z)$ operators arise due to the vacuum fluctuations from fiber loss and are given by $$F_s(z)=\int b_{11}(z-z')f_s(z')dz'+\int b_{12}(z-z')f_i^+(z')dz'$$

$$F_i(z)=\int c_{11}(z-z')f_i(z')dz'+\int c_{12}(z-z')f_s^+(z')dz' \quad (3)$$

where $b_{11}=c_{11}=\mu e^{-\alpha_1 z/2}$; $b_{12}=c_{12}=\nu e^{-\alpha_1 z/2}$ and $f_s(z)$ and $f_i(z)$ are independent vacuum noise operators arising from the fiber loss and satisfy the commutation relations $[f_s(z), f_s^+(z')]=[f_i(z), f_i^+(z')]=\alpha_1\delta(z-z')$. Since the signal and idler of the entangled pair are sent on different transmission fibers, $F_s(z)$ and $F_i(z)$ are uncorrelated. For the given input state, the mean photon number (Eq. (4)) and the number correlations between the signal and idler photon pairs (Eq. (5)) are given by $$\langle A_s^+ A_s\rangle = e^{-\alpha_1 z}\langle A_s'^+ A_s'\rangle + \langle F_s^+ F_s\rangle; \quad (4)$$
$$\langle A_i^+ A_i\rangle = e^{-\alpha_1 z}\langle A_i'^+ A_i'\rangle + \langle F_i^+ F_i\rangle$$

$$\langle A_s^+ A_i^+ A_s A_i\rangle = e^{-2\alpha_1 z}\{|\mu\nu\alpha + \mu^2\beta|^2 + |\nu^2\alpha + 3\mu\nu\beta|^2 + 4|\beta\nu^2|^2\} + \quad (5)$$
$$e^{-\alpha_1 z}\langle A_s'^+ A_s'\rangle\langle F_i^+ F_i\rangle + e^{-\alpha_1 z}\langle A_i'^+ A_i'\rangle\langle F_s^+ F_s\rangle + \langle F_s^+ F_s\rangle\langle F_i^+ F_i\rangle$$

where $$\langle A_s'^+ A_s'\rangle = \langle A_i'^+ A_i'\rangle = \{|\alpha\nu + \mu\beta|^2 + 2|\beta\nu|^2\} \quad (6)$$

$$\langle F_s^+ F_s\rangle = \alpha_1 \int_0^z |\nu(z')|^2 e^{-\alpha_1 z'} dz' = \left(\frac{\gamma P}{g}\right)^2\left[\frac{\alpha_1 z}{4} - \frac{e^{-2\alpha_1 z}}{8} + \frac{e^{-\alpha_1 z}}{2} - \frac{3}{8}\right] \quad (7)$$

Equation (4) gives the output mean photon number for the signal 207a and idler 207b, where the second term on the right side is the average added noise photons due to fiber loss, given by Eq. (7). At large distances, the first term on the right side of Eq. (7) is dominant, which shows that this noise increases linearly with distance. The loss frustration preserves the signal with only a linear increase in noise as a function of distance, thus decoupling the quantum signal rate from exponential loss. Since the signal is preserved, the entangled photon transmit rate is preserved through the fiber channel.

Equation (5) gives the coincidence counts between the signal photons 207a and idler photons 207b, with the last three terms on the right side represent the noise terms, known in the art as accidental coincidences. The noise due to fiber loss is white and spread over a spectral region equivalent to the bandwidth of the distributed OPSAs 430a, 430b. We estimate that noise photons can be suppressed by a factor of 60 using optical filtering (25 GHz passband filters for each WDM channel, with a total OPSA bandwidth of ~12 nm (see e.g., Marhic). After transmission over the loss-regulating OPSAs 430a, 430b, Alice 470a and Bob 470b receive the signal and idler photons 207a, 207b, respectively=. At each user 470a, 470b, the signal and idler spectrums may be carved into a pair-wise array of independent photon-pair channels using 50 GHz-spaced WDMs 460a, 460b. Each channel is connected to a pair of basis measurement interferometers 420a, 420b, each of which has been set to the appropriate phase offset (e.g., $\phi 1=0$, $\phi 2=\pi/2$ relative to the source interferometer 410a). Finally, the photon pairs are detected by Alice 470a and Bob 470b using single-photon detectors 475a, 475b.

Figure 5:
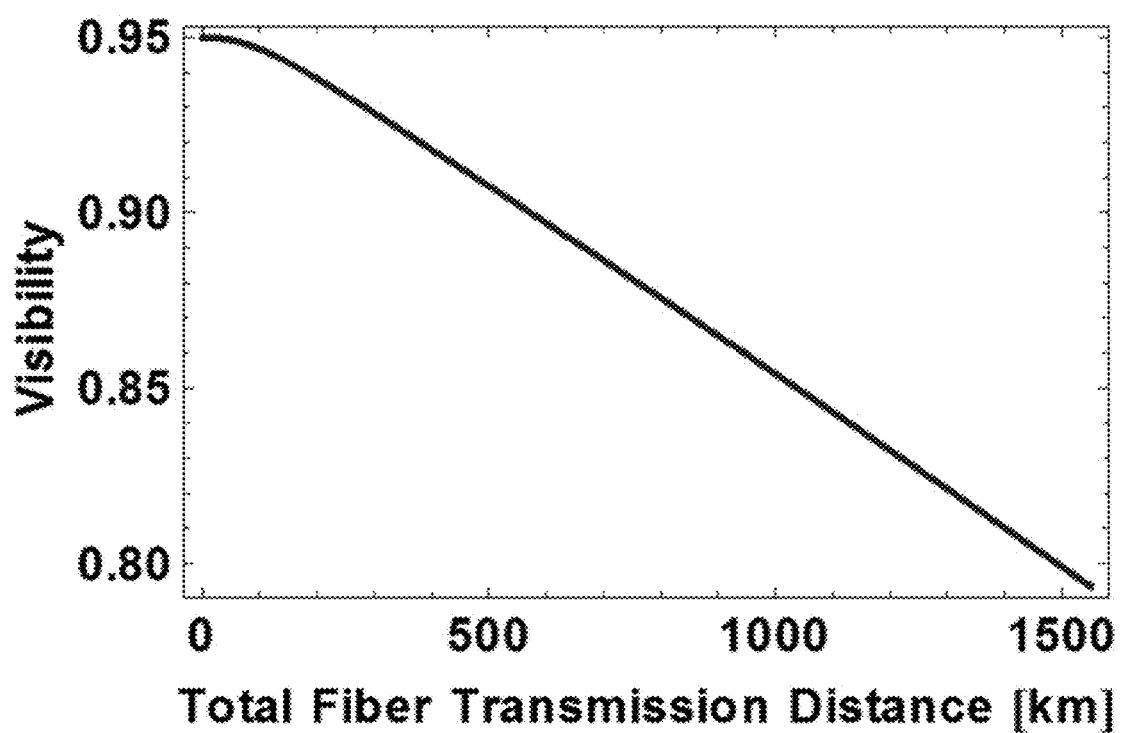
FIG. 5 shows an upper bound on the entanglement visibility obtained from using an OPSA-based loss frustration approach as a function of total fiber transmission distance.

V(z) is the entanglement visibility as a function of distance. The visibility is calculated from the minimum and maximum of the coincidence counts given by Eq. (5). FIG. 5 shows the predicted visibility upperbound using an OPSA-based loss frustration approach as a function of total fiber transmission distance (z) up to 1500 km. Phase-matching is assumed ($|\beta|^2=0.05$, $\alpha_1=0.15$ dB/km, $\gamma=2.3$ W$^{-1}$ km$^{-1}$, $P=\alpha_1/(2\gamma)$. While the above equations are valid for any phase-matching conditions, for simplicity, phase-matching has been assumed: $k=0$ and $g=\gamma P$. Other parameters are: $\alpha_1=0.15$ dB/km (ultra-low loss fiber (see e.g., Y. Chigusa et. al., "Low-Loss Pure-Silica-Core Fibers and Their Possible Impact on Transmission Systems," J. Lightwave Technology, Vol. 23, pp. 3541-3550 (2005))), $\gamma=2.3$ W$^{-1}$ km$^{-1}$, $P=\alpha_1/(2\gamma)$, $|\beta|^2=0.05$. By breaking the exponential relationship between loss and bit rate common to quantum communications, examples of the present disclosure may allow for diverse future quantum communications technology to move beyond short range applications.

Extensive work has been done with both phase-insensitive and phase-sensitive parametric amplifiers with classical input signals. Noiseless amplification has been demonstrated with classical signals in fiber OPSAs (see e.g., Z. Tong, et. al., "Towards ultrasensitive optical links enabled by low-noise phase-sensitive amplifiers," Nature Photon. 5, 430-436, 2011 (hereinafter "Tong"). Frequency non-degenerate four wave mixing (FWM)-based fiber OPSAs have been investigated (see e.g., R. Tang, J. Lasri, P. S. Devgan, V. Grigoryan, P. Kumar, and M. Vasilyev, "Gain characteristics of a frequency nondegenerate phase-sensitive fiber-optic parametric amplifier with phase self-stabilized input," Opt. Express 13(26), 10483-10493 (2005) and J. Kakande, C. Lundstrom, P. A. Andrekson, Z. Tong, M. Karlsson, P. Petropoulos, F. Parmigiani and D. J. Richardson, "Detailed characterization of a fiber-optic parametric amplifier in phase-sensitive and phase-insensitive operation," Opt. Express 18, 4130-4137 (2010)) for various applications in fiber communication systems such as in-line amplification (see e.g., Tong) and regeneration of phase-encoded signals (see e.g., R. Slavik, et. al., "All-optical phase and amplitude regenerator for next-generation telecommunications systems," Nature Photon. 4, 690-695, 2010).

As is well-known, the gain of an OPSA for classical input signals can be obtained from the parametric amplification equations (see e.g., G. P. Agrawal, Nonlinear fiber optics (Academic Press, San Diego, 1995)). It is assumed that the pump, signal, and idler are co-polarized. Also pump depletion and linear propagation losses are neglected and continuous wave (CW) operation is assumed. Thus the signal ($A_s(z)$) and idler ($A_i(z)$) output field operators after a distance z and the corresponding signal gain for the single pump and non-degenerate signal and idler configuration are:

$$A_s(z) = \mu A_s(0) + \nu A_i^+(0)$$

$$A_i(z) = \mu A_i(0) + \nu A_s^+(0)$$

$$G_{psa} = (|\mu|^2 + |\nu|^2) + 2|\mu\nu|\cos(\theta_\nu - \theta_\mu - \theta_s - \theta_i)$$

$$\mu = e^{\frac{i}{2}[\Delta\beta + 2\gamma P]z}\left\{\cosh(gz) - \frac{i}{2g}(\Delta\beta - 2\gamma P)\sinh(gz)\right\};$$

$$\nu = ie^{\frac{i}{2}[\Delta\beta + 2\gamma P]z}\frac{\gamma P}{g}e^{2i\theta_p}\sinh(gz)$$

$A_s(0)$ and $A_i(0)$ are the signal and idler fields at the input. Further, $|\mu|^2 - |\nu|^2 = 1$, $\kappa = \Delta\beta + 2\gamma P_p$ is the phase mismatch, $\Delta\beta = \beta_s + \beta_i - 2\beta_p$ is the linear phase mismatch between signal, idler and pump ($\beta_s$, $\beta_i$, $\beta_p$ are the respective propagation constants), $\gamma$ is the nonlinear coefficient, $g = [(\gamma P_p)^2 - (\kappa/2)^2]^{1/2}$ and $\theta = \phi_s + \phi_i - 2\phi_p$ is the relative phase difference between pump, signal, and idler at the input of the PSA. For perfect phase-matching $\kappa = 0$, and the maximum gain is obtained for $\theta = \pi/2$ (in-phase gain) and $G_{max} = \exp(2\gamma P_p L)$. The maximum gain has an exponential dependence on the pump power for perfect phase-matching. For $\kappa = 0$, $2\gamma P_p = -\Delta\beta$ is required. For perfect phase-matching, the linear phase mismatch $\Delta\beta$ has to cancel the nonlinear phase shift due to self-phase modulation (SPM) on the pump ($2\gamma P_p$). This condition implies that the pump be selected in the anomalous dispersion regime of the $\chi^{(3)}$ nonlinear material where a negative $\Delta\beta$ can cancel the positive nonlinear phase shift. Furthermore, to prevent signal walk-off, it is advantageous to operate close to the zero dispersion wavelength of the nonlinear material. Phase matching depends strongly on the dispersion properties of the material and it might not always be possible to be perfectly phase-matched. Even under these conditions gain is possible. For $\kappa \neq 0$, such that $\kappa = 2\gamma P_p$ (i.e., $\Delta\beta = 0$) and $\theta = \pi/2$, the gain grows quadratically with $\gamma PL$ and is given by $G^{\kappa = 0} = 1 + 2\gamma P_p L + 2(\gamma P_p L)^2$.

OPAs and OPSAs may be implemented in a material with $\chi^{(2)}$ or $\chi^{(3)}$ nonlinearity. In a $\chi^{(3)}$ waveguide such as dispersion shifted fiber (DSF), photons are naturally in a single spatial mode of the fiber, which results in increased stability, lower loss, and ease of phase-matching. The lower effective nonlinearity of conventional $\chi^{(3)}$ materials (such as DSF) requires the use of some combination of longer fibers or higher pump powers to obtain some target gain. However, newer $\chi^{(3)}$ materials with higher nonlinearity have been developed that include highly nonlinear fiber, photonic crystal fiber, bismuth oxide doped nonlinear fiber, chalcogenide glass, etc., in which OPAs (again mostly for wavelength conversion) have been demonstrated (see e.g., T. Andersen et al. "Continuous wave wavelength in a photonic crystal fiber with two zero dispersion wavelengths," *Optics Express* v.12(17) pp. 4113-4122 (2004), B. J. Eggleton, et. al. "Chalcogenide Glass Advanced for All-Optical Processing", *Photonics Spectra*, September 2007, and references therein, and J. H. Lee et al., "Bismuth oxide based nonlinear fiber with a high SBS threshold and its application to four wave mixing wavelength conversion using a pure continuous wave pump," *J. Lightwave Tech.* v.24(1) pp. 22-28, 2006. In recent years OPAs have also been demonstrated in integrated resonant silicon structures making them compact and significantly improving the peak pump power requirements (see e.g., A. C. Turner, M. A. Foster, A. L. Gaeta, M. Lipson, "Ultra-low power parametric frequency conversion in a silicon microring resonator," Optics Express Vol. 16, 4881-4887 (2008)).

In all these applications, the OPA or OPSA is a bulk device performing wavelength conversion, regeneration, or amplification of classical signals. A distributed OPA was demonstrated for classical signals (see e.g., G. Kalogerakis, M. E. Marhic, K. Wong, and L. G. Kazovsky, "Transmission of Optical Communication Signals by Distributed Parametric Amplification," J. Lightwave Technology, Vol. 23, pp. 2945-2953 (2005)). In addition, distributed OPSAs have been theoretically described but again for classical communications (see e.g., M. Vasilyev, "Distributed phase-sensitive amplification," Opt. Express 13, 7563-7571 (2005)). Here, distributed OPSAs are employed for quantum signals. The distributed OPSA is used to compensate exactly for the loss in the transmission fiber in order to distribute entangled single photon pairs over long distances.

In examples of the present disclosure, time-bin entanglement is employed for quantum signal, which has a known quantum state before the OPSA and an indistinguishable superposition is formed only at the receivers. Thus, the no-cloning theorem is not violated and a noiseless distributed optical amplifier is applied for exact compensation of the transmission fiber loss.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A system for quantum communications, comprising:
a source of photons, the source configured to place a signal photon and an idler photon in individual unknown quantum states and in a known entangled quantum state;
one or more pair of transmission channels connected to the source, each of the pair of transmission channels configured to transport one of the signal photon or the idler photon, each of the pair of transmission channels configured to substantially balance an instantaneous transmission loss with an instantaneous transmission gain distributed over a transmission distance;
one or more analysis interferometers, each configured to receive a corresponding one of the signal photon or the idler photon, configured to perform a basis measurement on one of the signal photon or the idler photon; and
one or more single-photon detectors at an output of the analysis interferometers for detecting one of the signal photon or the idler photon.

2. The system of claim 1, wherein the source of photons comprises a time-bin entangled source of photons.

3. The system of claim 2, wherein the time-bin entangled source of photons comprises a pump laser and a dispersion shifted fiber for generating the signal photon and the idler photon at a signal wavelength and an idler wavelength, respectively.

4. The system of claim 3, wherein the pump laser is a mode locked laser configured to produce pulses of light.

5. The system of claim 3, wherein the time-bin entangled source of photons further comprises a time-imbalanced source interferometer coupled to the pump laser to split pulses of light generated by the pump laser into two time bins.

6. The system of claim 5, wherein a degree of imbalance of time traveled by photons in the time-imbalanced source interferometer matches a degree of imbalance of time traveled by photons in each of the analysis interferometers and configured to receive corresponding one of the signal photon or the idler photon.

7. The system of claim 5, wherein the time-bin entangled source of photons further comprises a dispersion shifted fiber coupled to the time-imbalanced interferometer to generate the signal and idler photons and a wavelength division demultiplexer coupled to the dispersion shifted fiber to separate and to transmit the signal photon and the idler photon in a corresponding one of the pair of transmission channels.

8. The system of claim 1, wherein the one or more single photon detectors includes first and second single photon detectors, wherein the source is substantially centrally located with respect to each of the first and second single photon detectors.

9. The system of claim 1, wherein each of the one or more pair of transmission channels comprises a distributed optical phase-sensitive amplifier.

10. The system of claim 9, wherein the distributed optical phase-sensitive amplifier comprises a dispersion-shifted fiber.

11. The system of claim 10, wherein the dispersion-shifted fiber is a highly nonlinear microstructure fiber.

12. The system of claim 10, wherein the source is configured for creating the signal photon and the idler photon, wherein the dispersion-shifted fiber is configured to have a zero-dispersion wavelength proximal to a wavelength of operation of a pump laser associated with the source for creating the signal photon and the idler photon.

13. The system of claim 10, wherein the source is configured for generating the signal photon and the idler photon, wherein the distributed optical phase-sensitive amplifier further comprises a pump refresh stage coupled to the dispersion-shifted fiber for amplifying a pump signal associated with the source for generating the signal photon and the idler photon.

14. The system of claim 10, wherein the distributed optical phase-sensitive amplifier further comprises a pair of a phase-locked pulsed-pump lasers coupled to the dispersion-shifted fiber, wherein signal photons are frequency non-degenerated with respect to the idler photons.

15. The system of claim 10, wherein the distributed optical phase-sensitive amplifier further comprises a pair of phase-locked pump lasers coupled to the dispersion-shifted fiber, wherein signal photons are frequency degenerate with respect to the idler photons.

16. The system of claim 9, wherein each of the one or more pair of transmission channels comprises a dispersion compensation module in optical communication with the dispersion-shifted fiber to preserve a pulse shape of a signal corresponding to the idler photon or the signal photon.

17. The system of claim 1, wherein first and second of the one or more analysis interferometers comprises a passive polarization-independent beam splitter to randomly choose between measurement of the quantum states of the signal photon or the idler photon in one of two non-orthogonal bases.

18. A method for facilitating quantum communications, comprising:
    generating a signal photon and an idler photon, wherein each of the signal photon and the idler photon is in an unknown quantum state and in a known entangled quantum state;
    separating the signal photon and the idler photon;
    transmitting each of the signal photon and the idler photon separately in one or more transmission channels, each of the one or more transmission channels operable to substantially balance an instantaneous transmission loss with an instantaneous transmission gain distributed over a transmission distance;
    performing a random state measurement in one of two non-orthogonal bases on each of the signal photon and the idler photon; and
    detecting each of the signal photon and the idler photon.

19. The method of claim 18, wherein entangling the signal photon and the idler photon comprises time-bin entangling the signal photon and the idler photon, wherein the signal photon and idler photon are in a known entangled quantum state.

20. The method of claim 18, wherein each of the one or more transmission channels comprises a distributed optical phase-sensitive amplifier.

21. The method of claim 20, wherein the distributed optical phase-sensitive amplifier of at least one of the one or more transmission channels comprises a dispersion-shifted fiber.

22. The method of claim 20, wherein the distributed optical phase-sensitive amplifier further comprises a pump refresh stage coupled to the dispersion shifted fiber for amplifying a pump signal associated with the source for generating the signal photon and the idler photon.

23. The method of claim 18, wherein performing a basis measurement of the signal photon or the idler photon comprises employing a passive polarization-independent beam splitter to randomly choose between non-orthogonal basis measurements of the signal photon or the idler photon.

* * * * *